(12) United States Patent
Williams et al.

(10) Patent No.: US 9,721,363 B2
(45) Date of Patent: Aug. 1, 2017

(54) ENCODING POLYGON DATA FOR FAST RETRIEVAL AND RENDERING

(71) Applicant: GOOGLE INC., Mountain View, CA (US)

(72) Inventors: Brian Williams, Seattle, WA (US); Harlan Hile, Seattle, WA (US); Hannah Tang, Seattle, WA (US); Andrew Miller, Seattle, WA (US); David Sunderland, Seattle, WA (US)

(73) Assignee: GOOGLE INC., Mountain View, CA (US)

( * ) Notice: Subject to any disclaimer, the term of this patent is extended or adjusted under 35 U.S.C. 154(b) by 586 days.

(21) Appl. No.: 14/281,436

(22) Filed: May 19, 2014

(65) Prior Publication Data
US 2015/0332487 A1 Nov. 19, 2015

(51) Int. Cl.
*G06T 11/20* (2006.01)
*G06T 17/20* (2006.01)

(52) U.S. Cl.
CPC .......... *G06T 11/203* (2013.01); *G06T 17/20* (2013.01); *G06T 2210/08* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 4,901,251 A | 2/1990 | Sfarti | |
| 5,303,340 A | 4/1994 | Gonzalez-Lopez et al. | |
| 5,392,392 A * | 2/1995 | Fischer | G06T 15/87 345/443 |
| 5,784,075 A | 7/1998 | Krech, Jr. | |
| 6,304,270 B1 | 10/2001 | Danielson et al. | |
| 6,307,555 B1 * | 10/2001 | Lee | G06T 17/20 345/421 |
| 6,342,883 B1 * | 1/2002 | Kawaoka | G06T 17/00 345/420 |
| 6,369,813 B2 | 4/2002 | Pentkovski et al. | |
| 6,437,779 B1 | 8/2002 | Saito et al. | |
| 6,504,543 B1 | 1/2003 | Okamoto et al. | |
| 6,704,021 B1 | 3/2004 | Rogers et al. | |
| 6,717,577 B1 | 4/2004 | Cheng et al. | |
| 6,762,765 B2 | 7/2004 | Doyle et al. | |
| 6,791,560 B2 | 9/2004 | Lu | |
| 6,798,411 B1 * | 9/2004 | Gorman | G06T 17/20 345/420 |

(Continued)

FOREIGN PATENT DOCUMENTS

WO WO-00/04502 A1 1/2000

*Primary Examiner* — Ryan R Yang
(74) *Attorney, Agent, or Firm* — Marshall, Gerstein & Borun LLP

(57) ABSTRACT

An indexed list of vertices is generated to represent a polygon. The indexed list is ordered so as to define one or more boundaries of a polygon, where each element in the indexed list of vertices specifies respective coordinates in an at least two-dimensional space. A description of several component shapes that make up the polygon is generated, where the description includes indices into the indexed list of vertices. The indexed list of vertices and the description of the component shapes are provided to a computing device for rendering the polygon.

19 Claims, 8 Drawing Sheets

(56) References Cited

U.S. PATENT DOCUMENTS

| | | | |
|---|---|---|---|
| 6,889,176 B1* | 5/2005 | Buttolo | G06T 17/205 |
| | | | 345/420 |
| 6,950,108 B2 | 9/2005 | Doyle et al. | |
| 6,977,652 B2 | 12/2005 | Senda et al. | |
| 7,170,512 B2 | 1/2007 | Southwell et al. | |
| 7,995,053 B2* | 8/2011 | Ohtani | G06T 11/40 |
| | | | 345/418 |
| 8,269,775 B2 | 9/2012 | Bourd et al. | |
| 8,558,842 B1 | 10/2013 | Johnson et al. | |
| 2004/0164985 A1 | 8/2004 | Kato et al. | |
| 2007/0159484 A1* | 7/2007 | Paaso | G06T 17/00 |
| | | | 345/441 |
| 2007/0236498 A1* | 10/2007 | Higuchi | G06T 11/00 |
| | | | 345/441 |
| 2010/0271374 A1* | 10/2010 | Feldstein | G06T 11/203 |
| | | | 345/441 |

* cited by examiner

602 { Triangle Indices = (0, i, i+1), where i = 1,2

612 { Triangle Indices = (0, i, i+1), where i = 1,2,3,4

622 { Triangle Indices = (0, i, i+1), where i = 1,2

ENCODING POLYGON DATA FOR FAST RETRIEVAL AND RENDERING

FIELD OF TECHNOLOGY

The present disclosure relates generally to image rendering systems, such as electronic map display systems and, more particularly, to using indexed lists of vertices to efficiently communicate and render polygon data.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Both the cost of delivering geometry data to a client device and the cost of rendering the geometry data into images affects the performance of vector image-driven applications, such as digital mapping applications. Efforts to minimize these two costs often result in pursuing conflicting objectives. For example, a more compact "encoding," or representation, of polygon data may generate data that requires less network bandwidth for delivery (and less local storage), but the compact representation likely will be more computationally intensive to render. Conversely, polygon data sent to client devices as partially pre-rendered may ease the computational cost of rendering, while, at the same time, increasing the cost of data delivery.

The cost of delivering polygonal map features, such as parks, lakes and buildings, is frequently dominated by the delivery of coordinates which define the outline, or boundary, of these polygons. On a client device, polygons are often rendered in two steps: (i) the outline is stroked, and (ii) the interior of the polygon is filled. As such, it is sufficient, in some cases, to deliver just the outline of the polygon to the client. With this information, the client device may both stroke the outline and fill the interior. However, the latter step is typically accomplished via scanline rendering or triangle tessellation. Both of these approaches are computationally intensive and may seriously affect performance, particularly on low-powered client devices.

SUMMARY

According to one embodiment, a method for generating representations of polygons includes generating, by one or more processors, an indexed list of vertices. The list is ordered so as to define one or more boundaries of a polygon, where each element in the indexed list of vertices specifies respective coordinates in an at least two-dimensional space. The method also includes generating, by the one or more processors, a description of component shapes that make up the polygon, where the description includes indices into the indexed list of vertices, and providing the indexed list of vertices and the description of the component shapes to a computing device for rendering the polygon.

According to another embodiment, a method for rendering polygons includes receiving, via a network interface at a client device, an indexed list of vertices of a polygon and a description of a plurality of component shapes that make up the polygon, where each element in the indexed list of vertices specifies respective coordinates in an at least two-dimensional space. The method further includes stroking, by a rendering module of the client device, a boundary of the polygon based on an ordering of vertices in the indexed list of vertices, filling the polygon based on the description of the component shapes, and causing the filled polygon with the stroked boundary to be displayed on a display device of the client device.

In yet another embodiment, a client device includes a display device, a communication interface, and processing hardware coupled to the display device and the communication interface. The processing hardware is configured to receive an indexed list of vertices of a polygon and a description of component shapes that make up the polygon, where each element in the indexed list of vertices specifies respective coordinates on a map tile of a digital map. The processing hardware is further configured to stroke a boundary of the polygon based on an ordering of vertices in the list of vertices, fill the polygon based on the description of the component shapes, and cause the map tile with the filled polygon and stroked boundary to be displayed on the display device.

In still another embodiment, a system includes one or more processors and a non-transitory computer-readable medium storing instructions that, when executed by the one or more processors, cause the system to: (i) generate an indexed list of vertices ordered so as to define one or more boundaries of a polygon, where each element in the indexed list of vertices specifies respective coordinates in an at least two-dimensional space, (ii) generate a description of component shapes that make up the polygon, where the description includes indices into the indexed list of vertices, and (iii) store the indexed list of vertices and the description of the plurality of component shapes in a computer-readable memory for retrieval during a rendering of the polygon.

According to another embodiment, a method for generating representations of polygons includes receiving, by one or more processors, data descriptive of geometry of a polygon. The method further includes generating, by the one or more processors, an indexed list of vertices ordered so as to define one or more boundaries of the polygon, where each element in the indexed list of vertices specifies respective coordinates in an at least two-dimensional space, generating, by the one or more processors, a description of a plurality of component shapes that make up the polygon, where the description includes indices into the indexed list of vertices, and storing the indexed list of vertices and the description of the component shapes to a computer-readable memory for retrieval during a rendering of the polygon.

DETAILED DESCRIPTION

The techniques of the present disclosure may be utilized to represent, or encode, polygons such that the encoded polygon data is both efficient for communication to a client device and easily rendered by a client device. Polygon data, generated according to these techniques, includes an indication of component shapes, such as triangles, making up the polygons. The description includes indices into an indexed list of vertices, where the indexed list of vertices stores all vertices of a polygon exactly once. The encoded polygon data prevents redundant storage and communication of vertices that are shared between two or more of the component shapes and reduces the amount of data required to represent each of the component shapes. Further, the representation of polygons allows for an implicit definition of the boundary of a polygon via an ordering of vertices in the indexed list of vertices.

In addition to the indexed list of vertices, encoded polygon data may include: (i) a list of "breaks" indices indicating locations where one polyline ends and another polyline starts (e.g., for polygons with holes); and (ii) a list of unstroked edges indices specifying segments in a polygon that should be left unstroked. To optimize the polygon data, a computer generating the polygon data may define certain polygons, such as concave/convex polygons, polygons with transparent fills, and polygons without borders, according to formulas for generating the description of component shapes and/or by omitting indices in a description of component shapes, list of break indices, or list of unstroked edges indices.

Although examples of encoded polygon data in the context of two-dimensional mapping applications will be used in the following description, it is understood that an encoding of any dimensional (e.g., three-dimensional) polygon data may be utilized by systems, devices, displays, etc. in contexts unrelated to mapping or navigation. For example, system or devices rendering images for gaming applications, virtual reality applications, scientific visualizations, three-dimensional modeling, etc.

System Overview

Figure 1:
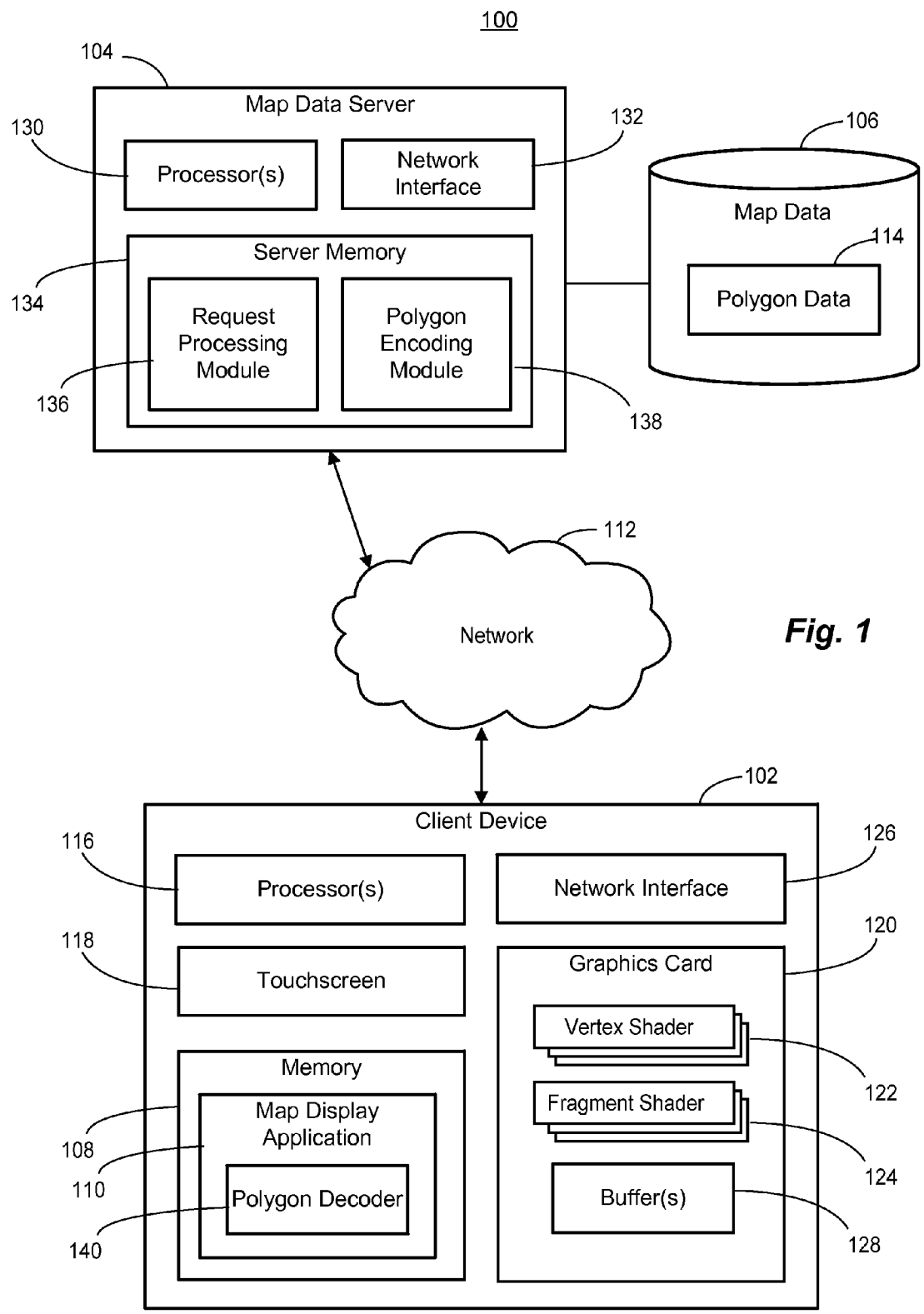
FIG. 1 illustrates an example computing system for encoding or representing polygons in accordance with the techniques of this disclosure.

FIG. 1 is a block diagram of an example computing system 100 for encoding or representing polygons in a manner that is both efficient for communication to a client device 102 and easily rendered by the client device 102. The system 100 includes a map data server 104 communicatively connected to the client device 102 and a map database 106. The client device 102 stores (e.g., in a memory 108) and implements a map display application 110. The client device 102 may be connected to the map data server 104 via any publically available or privately owned hardwired or wireless communication network 112, including for example a hardwired or wireless LAN, MAN or WAN, or any combination thereof. Some examples of client devices that may be implemented in the system 100 as the client device 102, include, and are not limited to mobile phone devices, computers such a laptop, desktop or other types of computers, components of other imaging systems such as components of automobile navigation systems, etc.

The map database 106 may store map data in one or more suitable formats such as raster images and vector graphics. In some scenarios, the software modules described below operate on polygon data 114 stored in a vector format. The vector data may define or include image object elements that each have two or more vertices or vertex data points defining the elements or primitives to be displayed within an image. Generally speaking, the polygon data 114 may define such image object elements using a set of vertices, which, along with descriptions of component shapes, are used to display an image object to a user via the client device 102.

The client device 102 includes one or more volatile and/or non-volatile memories (such as the non-transitory memory 108), a touchscreen 118 or other display device, and processing hardware including one or more processors 116 and a graphics card 120, which in turn can include one or more graphics processors. The touchscreen 118 may be any type of electronic display device such as a liquid crystal display (LCD), a light emitting diode (LED) display, a plasma display, a cathode ray tube (CRT) display, or any other type of known or suitable electronic display. More generally, the client device 102 can include any suitable display device (not necessarily a touchscreen) and an input device such as a keyboard, for example.

In some cases, the system 100 operates so that a user, at the client device 102, opens or executes the map display application 110 that communicates with and obtains map information or map-related data (e.g., representations of the polygon data 114) from the map database 106 via the map data server 104. The client device 102 may then display or render a map image based on the received map data. The map application 110 may allow the user to view different geographical portions of the map data stored in the map database 106, to zoom in or zoom out on a particular geographical location, rotate, or change the two-dimensional or three-dimensional viewing angle of the map being displayed, etc. More particularly, when rendering a map image on the touchscreen 118, the client device may receive or download representations of the polygon data 114 from the map data server 104 and process those representations of the polygon data 114 using one or more vertex shaders 122 and one or more fragment shaders 124 of the graphics card 120 to render an image on the touchscreen 118. The instructions that make up the vertex shaders 122 and the fragment shaders 124 can be stored, and executed by, the graphics card 120. The graphics card 120 may also include one or more buffers 128 to store vector image data, such as portions of or representations of the polygon data 114, received from the map data server 104. Such representations of the polygon data 114 are discussed further with reference to FIG. 2.

To facilitate data communication between the map data server 104 and the client device 102, the client device 102 may utilize a network interface 126. The network interface 126 can include any suitable software and/or hardware components that operate to communicate with, for example, the map data server 104 to obtain image data in the form of representations of the polygon data 114 for use in creating an image display on the touchscreen 118.

The map data server 104 may include one or more processors 130, a network interface 32, and a non-transitory computer-readable server memory 134 that stores instructions executable on the one or more processors 130. For example, a request processing module 136 may process requests from client devices such as the client device 102, identify and retrieve relevant portions of the polygon data 114 (e.g., polylines and patterns) along with other relevant map data, and transmit this data to the requesting client device via the network interface 132 and the network 112. Further, a polygon encoding module 138 may, after the request processing module 136 retrieves relevant portions of the polygon data 114 and prior to sending the portions of the polygon data 114 to the client device 102, encode or represent the portions of the polygon data 114 in a format or representation that is both efficient for communication to a client device 102 and easily rendered by the client device 102, as further discussed below. Upon receiving the data, the client device 102 may invoke a polygon decoder 140 configured to decode or process the encoded portions of the polygon data 114 from the map data server 104. For example, the polygon decoder 140 may process the encoded portions of the polygon data 114 and communicate vertices, indices into a list of vertices, etc. to the graphics card 120 for rendering.

In this implementation, the polygon decoder 140 and the shaders 122, 124 collectively define a rendering module of the client device 102. In general, depending on the implementation of the client device 102, the rendering module of the client device 102 can include only components executing on the one or more (general purpose) processors 116, only components executing on the one or more graphics processors of the graphics card 120, or both types of components.

Encoded Polygon Data

Figure 2:
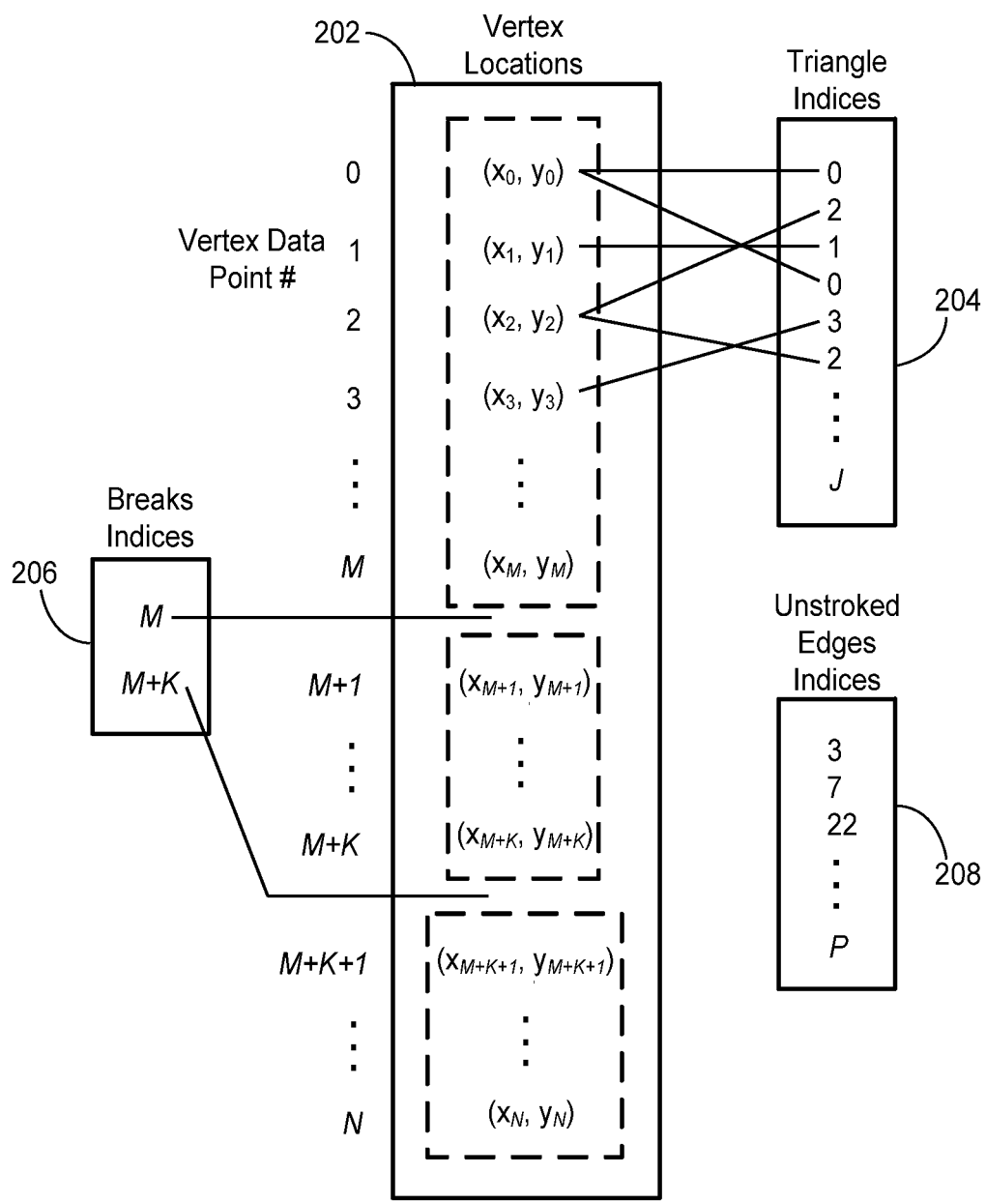
FIG. 2 illustrates an example structure of encoded polygon data, which can be used in the system of FIG. 1.

FIG. 2 illustrates a structure and content of example encoded polygon data 200, such as relevant portions of the polygon data 114 encoded by the map data server 104. For example, a polygon encoding module, such as the polygon encoding module 138, may generate the encoded polygon data 200 as further discussed with reference to FIG. 7. Although the example encoded polygon data 200 includes a certain number of vertices and indices, in general encoded polygon data may include any suitable number of vertices and indices to represent one or more polygons.

The example encoded polygon data 200 may be generated (e.g., by the polygon encoding module 138) to represent one or more polygons defining footprints of geographic features such as roads, lakes, building, etc., utilized by a map display application. An example indexed list of vertices 202 describes locations of N vertices on a plane as pairs of (x, y) coordinates. In an implementation, the indexed list of vertices 202 includes exactly one element for each vertex of a polygon represented by the encoded polygon data 200. In this manner, the encoded polygon data avoids any unnecessary redundant storage of polygon vertices.

In some implementations, the elements of the indexed list of vertices 202 may be expressed in terms of coordinates local to map "tiles." For example, map data, such as the polygon data 114, utilized by the map display application 110 may be organized into map tiles, where a map tile represents a portion of the Mercator projection of the world at a particular zoom level. Within a particular map tile, all map geometry or content, such as polygons representing roads, lakes, etc., is represented in coordinates which are local to that tile. Thus, the coordinates $(x_0, y_0)$, $(x_1, y_1), \ldots, (x_N, y_N)$ in the indexed list of vertices 202 may be values (e.g., numerical values) of coordinates local to a particular map tile. Although two-dimensional coordinates are illustrated in FIG. 2, encoded polygon data in other implementations may include three-dimensional coordinates representative of vertices of a three-dimensional shape.

A polygon encoding module, such as the polygon encoding module 138, may order the elements of the example indexed list of vertices 202 so that the ordering of the elements defines a boundary of one or more polygons represented by the encoded polygon data 200. That is, when rendering a polygon represented by the polygon data 200, the graphics card 120, the polygon decoder 140, and or the processors 116 may "stroke" a boundary of the polygon according to the ordering of elements in the indexed list of vertices 202. For example, the graphics card 120 may render a boundary of a polygon by drawing, rendering, or stroking a line by starting at the "0" vertex location $(x_0, y_0)$, stroking a line from $(x_0, y_0)$ to $(x_1, y_1)$, stroking a line from $(x_1, y_1)$ to $(x_2, y_2)$, etc. In this manner, the boundary of a polygon is naturally defined within the indexed list of vertices 202.

The encoded polygon data 200 may also include a description of component shapes making up the polygon which the polygon data 200 represents. For example, when triangles are used as component shapes making up a polygon, the encoded polygon data 200 may include a list of triangles indices 204 into the indexed list of vertices 202. Each of the indices "0, 2, 1, . . . J" in the list of triangles indices 204 references an element of the indexed list of vertices 202. That is, each index in the list of triangles indices 204 references a single vertex location or vertex data point.

In an implementation, a description of component shapes, such as the list of triangles indices 204, may be ordered such that every three, four, five, or other set number of indices in the description of component shapes defines one component shape. In the case of the list of triangles indices 204, for example, the first three indices "0, 2, 1" may point to (or reference) three vertices in the indexed list of vertices 202 that define the three points of a first triangle component shape. Likewise, the second three indices "0, 3, 2" may point to another three vertices in the indexed list of vertices 202 that define the three points of a second triangle component shape. Each component shape may share one or more indices, as do the first two triangles indicated in the list of triangles indices 204. However, each vertex, to which the indices refer, may be stored only once in the indexed list of vertices 202, according to this implementation. According to other implementations, certain vertices may be stored twice in the indexed list of vertices 202. For example, the indexed list of vertices 202 may store a vertex twice in the case of a self intersection within a polygon.

By storing vertices exactly once in the indexed list of vertices 202 and defining component shapes in terms of indices into the indexed list of vertices 202, transmission and storage of the encoded polygon data 200 becomes more efficient, due to the elimination of redundant vertex data. Moreover, a client device can easily render the polygon data 200 using the description of component shapes (e.g., a pre-tessellation of a polygon) in the polygon data 200. In many implementations, indices are encoded as one-byte values, while the description of each vertex requires two to four bytes. Thus, a system, such as system 100, may significantly reduce a cost of communication of polygon data by storing a single indexed list of vertices and groups of indices into the indexed list of vertices for each component shape (e.g., triangle of a tessellation) instead of storing groups of vertices for each component shape.

Referring again to FIG. 2, the encoded polygon data 200 also may include a list of break indices 206. Each index in the list of break indices 206 may indicate a position in the indexed and ordered list of vertices 202, where one polyline ends and another polyline starts. For example, an element "M" in the list of break indices 206 may indicate that a polyline, such as a polyline representing the outer boundary of a lake, ends and another polyline, such as a polyline representing a boundary between the lake and an island, begins at vertex data point "M+1." It is understood that an index in the list of break indices 206 may optionally represent either a beginning of a new polyline or an end of a polyline. FIG. 2 illustrates each of three groups of vertices representing three polylines, where the polylines are segmented by the list of break indices 206, with dotted line boxes.

The encoded polygon data 200 may still further include a list of unstroked edges indices 208. Each index in the list of unstroked edges indices 208 may indicate one or more segments of a polygon boundary or polyline of the polygon that is to remain unstroked in a rendering of the polygon. Such unstroked edges may occur when only a portion of a polygon is rendered on a single map tile, when polygons include holes, etc.

In an example scenario, the encoded polygon data may include an index "3" in the list of unstroked edges indices 208. Accordingly, a client device may (e.g., with the graphics card 120) stroke a polyline from vertex position "2" (e.g., at coordinates $x_2$, $y_2$) to vertex position "3," but not from vertex position "3" to vertex position "4." That is a line starting from the position referenced by the index in the list of unstroked edges indices 208 remains unstroked. The client device may then continue to stroke the polyline from vertex position "4" to vertex position "5," for example. It is understood that an index in the list of unstroked edges indices 208 may indicate a beginning of an unstroked segment or an end of an unstroked segment. For example, an index "3" in the list of unstroked edges indices 208 may indicate an unstroked segment from vertex data points "3" to "4" or from vertex data points "2" to "3." Also, indices in the list of unstroked edges indices 208 may indicate that multiple adjacent segments of a polyline are to remain unstroked. In fact, the list of unstroked edges indices 208 may include all indices of a particular polyline such that the entire polyline remains unstroked in rendering.

Example Polygons and Corresponding Representations

Figure 3:
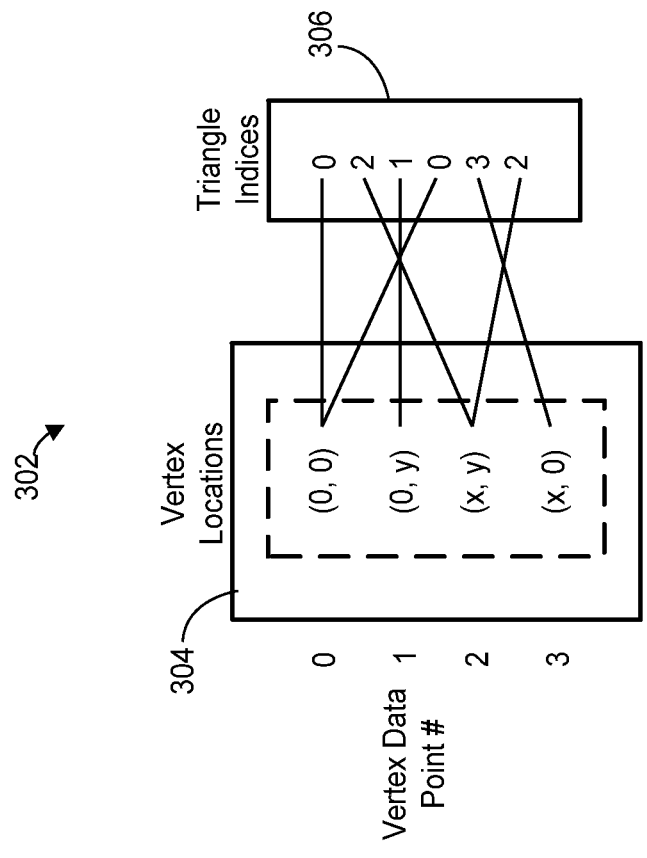
FIG. 3 illustrates an example polygon and its compact representation, which can be generated in the system of FIG. 1.
Figure 3:
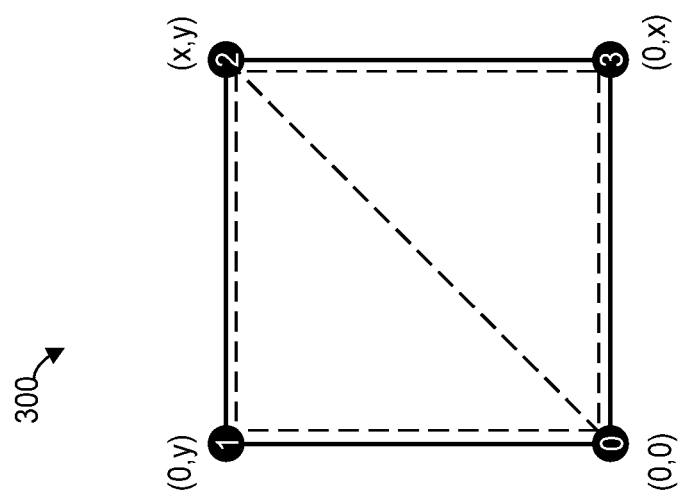

FIG. 3 illustrates an example polygon 300 and a corresponding representation 302 of that polygon 300. The example representation 302 may represent only a portion of the encoded polygon data representing the polygon 300. For example, encoded polygon data representing the polygon 300 may include break indices, unstroked edges indices, etc. as further discussed with reference to FIG. 2. However, for ease of discussion, FIG. 3 does not illustrate such indices.

The polygon 300 may include four vertices labeled "0," "1," "2," and "3" at corresponding vertex locations (0, 0), (0, y), (x, y), and (0, x), where x and y may be value of map tile local coordinates or any other suitable coordinates. The corresponding representation 302 of the polygon 300 includes an indexed list of vertices 304 and a list of triangles indices 306. The indexed list of vertices 304 includes one element for each of the vertex locations (0, 0), (0, y), (x, y), and (0, x) indicating the respective vertex location or vertex point.

The polygon encoding module 138, or other suitable module or device generating the representation 302, orders the elements of the indexed list of vertices 304 to define the boundary of the polygon 300. For example, the client device 102, when rendering the polygon 300, may stroke a boundary of the polygon 300 by starting at the vertex location (0, 0), stroking a line from (0, 0) to (0, y), stroking a line from (0, y) to (x, y), stroking a line from (x, y) to (0, x), and stroking a line from (0, x) by to (0, 0) as indicated in the ordering of vertices "0," "1," "2," and "3."

Further, to fill the polygon 300, or otherwise render the area inside of the polygon 300, a client device may process the list of triangles indices 306 to determine component shapes (triangles, in this case) that make up the polygon 300. In the example list of representation 302, a client device may determine two triangles based on two sets of three indices, in the list of triangles indices 306, defining two component triangle shapes. Specifically, the indices "0," "2," and "1" in the list of triangles indices 306 (i.e., the first three indices) may define a first triangle formed by the vertices (0, 0), (x, y), and (0, y), and the indices "0," "3," and "2" in the list of triangles indices 306 (i.e., the next three indices) may define a second triangle formed by the vertices (0, 0), (x, y), and (0, y). These triangles are illustrated within the polygon 300 via dotted lines.

Thus, the representation 302 of the polygon 300 allows the polygon 300 to be defined without redundant storage of vertices while still describing component shapes making up the polygon 300. Note, the indexed list of vertex locations 304 and the list of triangles indices 306 are illustrated as column type arrays of elements, indices, or values with each array beginning at an index "0" and being indexed by sequential indices. However, the vertex locations in an indexed list of vertex locations and indices in a list of triangles, breaks, or unstroked edges indices alternatively may organized along any suitable dimensions and may be indexed by any suitable indices. For example, an indexed list of vertices may be represented as an array of vertex locations beginning with an index value of "1" rather than "0."

Figure 4:
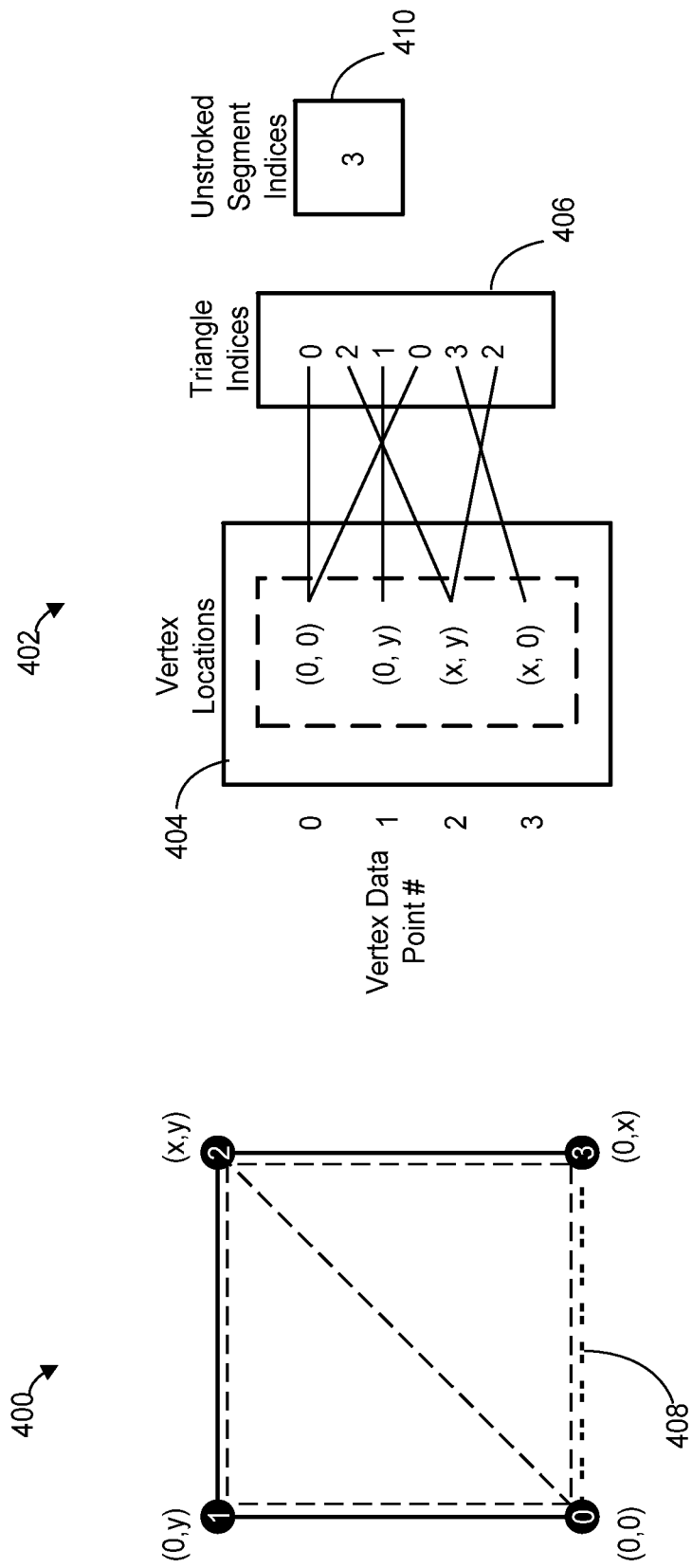
FIG. 4 illustrates another example polygon and its compact representation, which also can be generated in the system of FIG. 1.

FIG. 4 illustrates another example polygon 400 and a corresponding representation 402 of that polygon 400. The example representation 402 may also include break indices as further discussed with reference to FIG. 2. However, for ease of discussion, FIG. 3 does not illustrate such indices.

The polygon 400 is similar to the polygon 300 in that the polygon 400 includes four vertices labeled "0," "1," "2," and "3" at corresponding vertex locations (0, 0), (0, y), (x, y), and (0, x). Accordingly, the representation 402 includes an indexed list of vertices 404 and a list of triangles indices 406 similar to that of the representation 302. In contrast to the polygon 300, however, an edge 408 of the polygon 400 is to remain unstroked when the polygon is rendered (e.g., by the client device 102). As such, the representation 402 also includes a list of unstroked edges indices 410.

For the example polygon 400, the unstroked edges indices 410 of the representation 402 includes an index "3." In this manner, the unstroked edges indices 410 may indicate that the segment of the polygon beginning at the vertex referenced by index "3" (the edge 408, or the fourth segment along the boundary of the polygon 400 as indicated in the ordered indexed list of vertices 404) is to remain unstroked.

Figure 5:
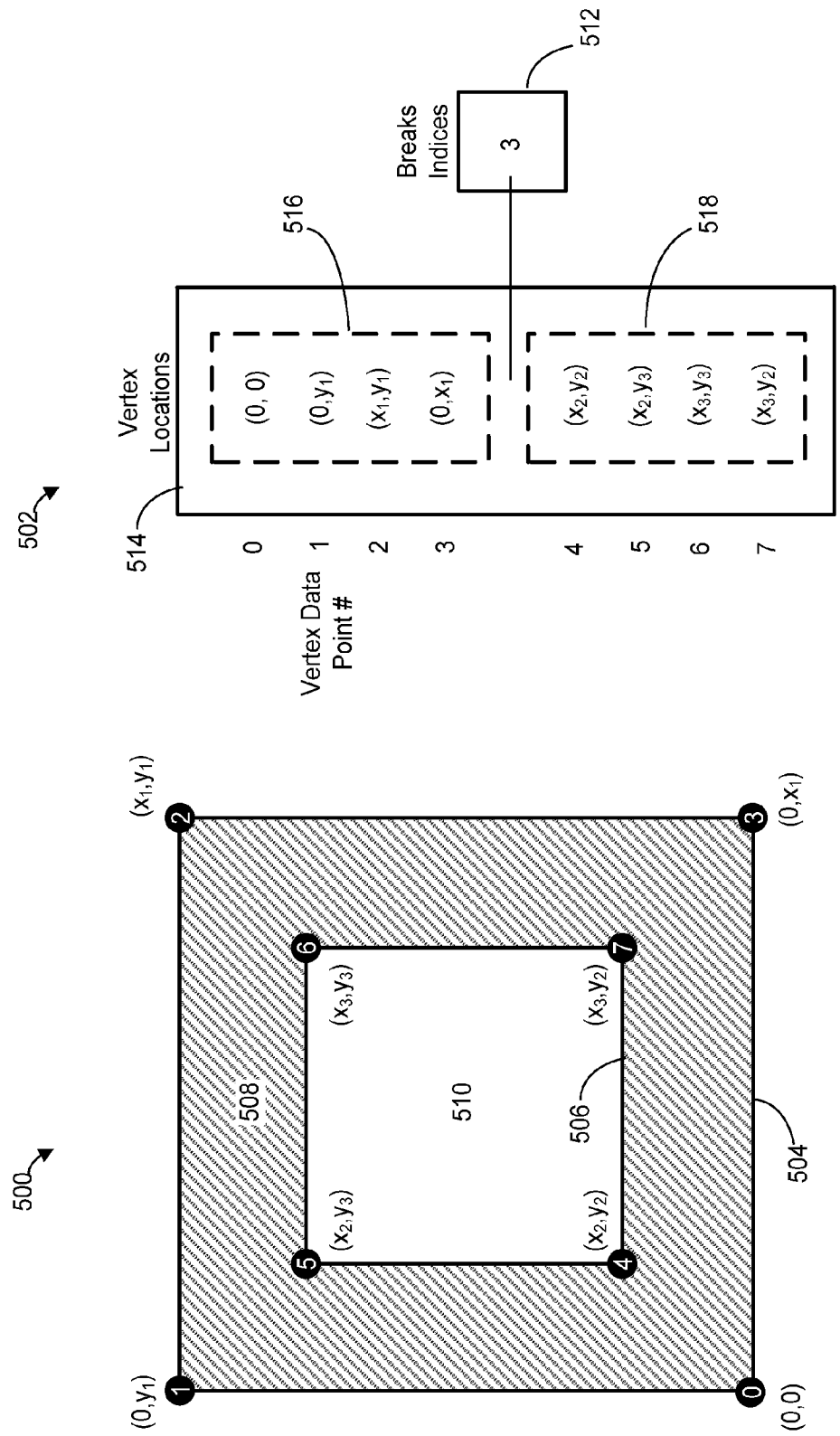
FIG. 5 illustrates yet another example polygon and its compact representation, which can be generated in the system of FIG. 1.

FIG. 5 illustrates yet another example polygon 500 and its corresponding representation 502. Encoded polygon data representing the polygon 500 may include the representation 502, but encoded polygon data representing the polygon 500 may also include triangles and unstroked edges indices, although not depicted in FIG. 5.

In contrast to the polygons 300 and 400, the polygon 500 includes multiple polylines and eight vertices labeled as "0," "1," "2," "3," "4," "5," "6," and "7." Specifically, the polygon 500 has two distinct polylines, an outer polyline 504 along an outer boundary of the polygon 500 and an inner polyline 506 along an inner boundary of the polygon 500. The outer polyline 504 includes vertices "0," "1," "2," and "3," and the inner polyline 506 includes vertices "4," "5," "6," and "7." Thus, the polygon 500 is made up of the area 508 with a hole 510 inside of the area 508.

Because the polygon 500 includes multiple polylines, the representation 502 may include a list of break indices 512 in addition to an indexed list of vertices 514. The list of break indices 512 may, in the example representation 502, include an index "3" such that the ordered vertices of the indexed list of vertices 514 is segmented into two groups of vertices 516 and 518 corresponding to the outer polyline 504 and the inner polyline 506, respectively. When a client device strokes boundaries of the polygon 500, the client device may stroke the outer polyline 504 based on the ordering of the group of vertices 516, terminate the stroking of the outer boundary based on the index "3" in the list of break indices 512, and stroke the inner boundary 506 based on the ordering of the group of vertices 518.

Although a client device stroking the inner boundary 506 after the outer boundary 504 is discussed above, polylines may be stroked in any order based on the ordering of vertices in an indexed list of vertices and a segmentation by a list of break indices. Further, although FIG. 5 illustrates two polylines and FIG. 2 illustrates three polylines, encoded polygon data may represent any number of distinct polylines of a polygon via an indexed list of vertices and a list of break indices.

Optimizations

For certain types of polygons, such as concave/convex polygons, polygons with transparent fills, and polygons without borders, a polygon encoding module may optionally optimize encoded polygon data.

In the case of concave/convex polygons or any other suitable polygons obeying certain definitions or rules (referred to herein as "simple polygons"), encoded polygon data may be optimized to include a mathematical or rule-based formula, or an indication of a specific type of simple polygon, in place of or in addition to a list of indices defining component shapes. The formula may allow a client device, such as the client device 102 to easily and efficiently generate a description of component shapes, as opposed to the description of component shapes being communicated from a map data server to the client device, in some scenarios.

Figure 6A:
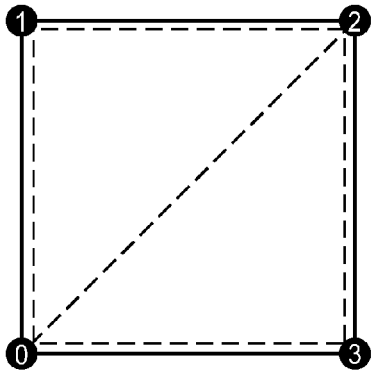
FIGS. 6A-C illustrate example polygons and the corresponding formulas for generating descriptions of component shapes making up these polygons, which can be used in the system of FIG. 1.
Figure 6B:
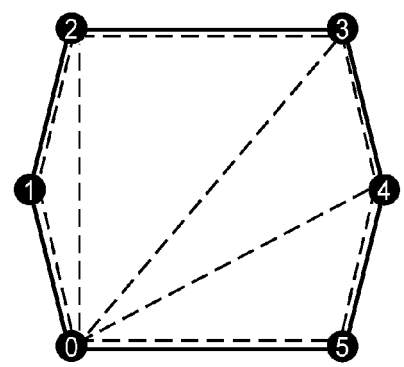
Figure 6C:
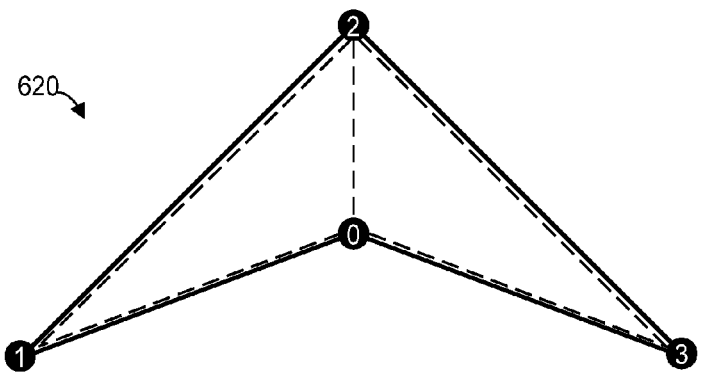

FIGS. 6A, 6B, and 6C illustrates example simple polygons for which encoded polygon data may be optimized. It is understood that polygons other than those depicted in FIGS. 6A, 6B, and 6C may be optimized in a substantially similar manner to that discussed below. Further, the optimization of encoded polygon data for simple polygons may be optional (e.g., optionally determined and executed by the polygon encoding module 138) based on network performance, client device configurations, amounts of requested data, or any other suitable metrics.

FIG. 6A illustrates one such simple polygon 600 that may be optimized when encoded (e.g., by polygon encoding module 138). Instead of representing the simple polygon 600 with an indexed list of vertices and a list of indices defining component shapes, encoded polygon data representing the simple polygon 600 may include an indexed list of vertices and a formula 602 that allows a client device itself to generate a description of component shapes.

In some cases, a map data server may communicate both an indexed list of vertices and the formula 602 to a client device for rendering the simple polygon 600. However, in other cases, a client device may store indications (e.g., in the map display application 110) of formulas, such as the formula 602, for a variety of pre-defined polygon types, and a map data server may, for a particular polygon, simply communicate an indexed list of vertices and indication of a type of polygon (e.g., a number, code, or text value indicating concave, convex, hexagon, square, etc.). Based on the indication of the type of polygon, the client device may locally retrieve a corresponding formula and generate an appropriate description of component shapes.

The example formula 602, when executed by a client device, may generate descriptions of triangles in the form of indices into an indexed list of vertices (e.g., includes vertices 0, 1, 2, and 3). Specifically, as indicated in FIG. 6A, a client device may generate a list of triangles indices by substituting i=1, 2 into (0, i, i+1), where the list of triangles indices includes indices (0, 1, 2, 0, 2, 3). FIGS. 6B and 6C illustrate two other example simple polygons 610 and 620 along with respective formulas 612 and 622 for generating triangles indices for the simple polygons 610 and 620. In each of the FIGS. 6A, 6B, and 6C, triangle component shapes of the example simple polygons 600, 610, and 620 are illustrated with dotted lines.

In addition to optimizations for simple polygons, a polygon encoding module may optimize polygon data in various other ways. For example, the polygon encoding module 138 may omit or leave empty a list of triangles indices or other description of component shapes from encoded polygon data for any polygons having transparent fills. Also, the polygon encoding module 138 may omit a list of break indices and a list of unstroked edges indices for any polygons that do not have a border or stroked boundary.

Generating Encoded Polygon Data

Figure 7:
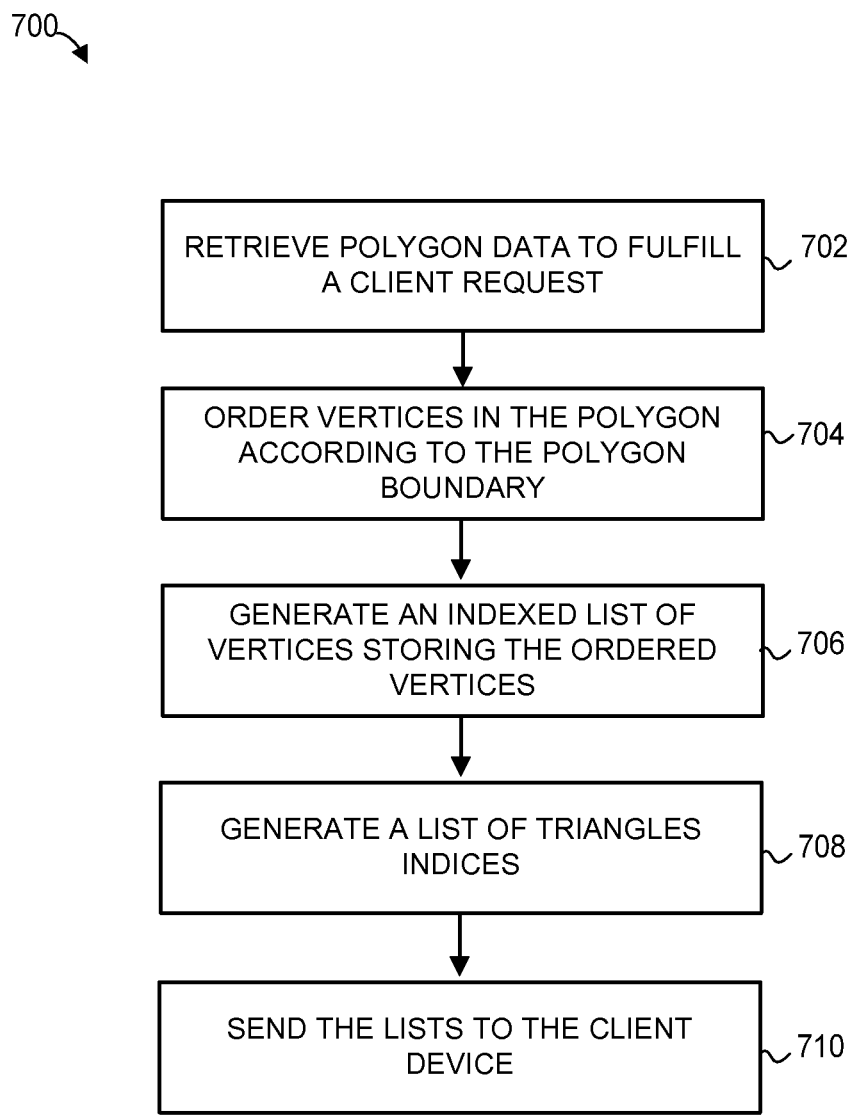
FIG. 7 is a flow diagram of an example method for generating encoded polygon data, which can be implemented in the system of FIG. 1.

FIG. 7 is a flow diagram of an example method 700 for generating encoded polygon data. The example method 700 may be implemented by the map data server 104, for example.

At block 702, polygon data or indications of polygons are retrieved to fulfill a request from a client device. The request processing module 136 may receive a request from the map display application 110 for polygon data, and the request processing module 136 may retrieve relevant portions of the polygon data 114 to satisfy the request. For example, the client device may request polygon data for rendering newly displayed map tiled in a mapping application due to a user zoom or pan interaction.

At block 704, vertices of one or more polygons indicated in retrieved portions of polygon data are ordered to define boundaries of the one or more polygons. As discussed with reference to FIGS. 2 and 5, the polygon encoding module 138 may order vertices of a polygon to define one or more polylines that are stroked, by a client device, to generate borders of the polygon. In some cases, such an ordering includes defining a beginning and end point of a polyline and ordering vertices along the boundary of a polygon from the being point to the end point.

Next (block 706), an indexed list of vertices is generated including the ordered vertices of the one or more polygons. The polygon encoding module 138 may generate an array, list, table, vector, or any other suitable structure and populate that structure with the ordered vertices, ordered at block 704. Each element of the indexed list of vertices may include one or more coordinates, such as map tile local coordinates, and may be associated with a specific index value, such as 0, 1, 2, etc.

At block 708, a description of component shapes, such as a list of triangles indices, corresponding to the polygons indicated in the retrieved portions of polygon data is generated. The polygon encoding module 138 may generate a list of indices where groups of two, three, etc. of the indices reference a corresponding two, three, etc. vertices in the indexed list of vertices. The groups of referenced vertices may indicate the vertices of component shapes, such as triangles, squares, hexagons, etc., making up the polygons indicated in the retrieved portions of polygon data.

Next (block 710), the indexed list of vertices and the description of component shapes is communicated or provided to the requesting client device. The map data server 104 may communicate the indexed list of vertices and the description of component shapes (the encoded polygon data) to the client device 102 via any suitable communication protocol and network devices. For example, the map data server 104 may communicate the encoded polygon data uses Hypertext Transfer Protocol (HTTP) messages and any other suitable protocol, such as a protocol specifically designed for use with mapping applications.

Rendering Polygons

Figure 8:
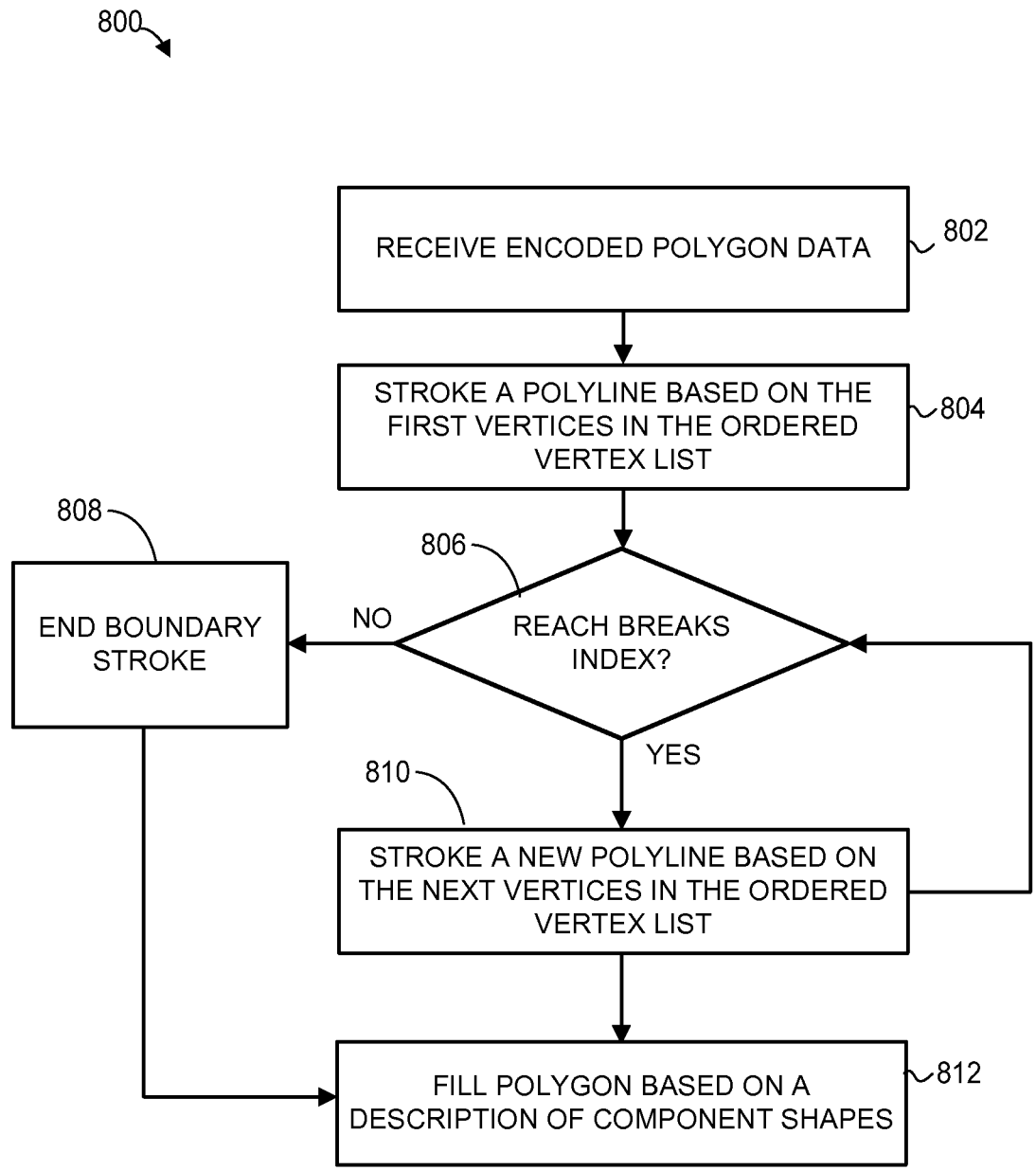
FIG. 8 is a flow diagram of an example method for rendering encoded polygon data, which can be implemented in the system of FIG. 1.

FIG. 8 is a flow diagram of an example method 800 for stroking the boundaries of and filling one or more polygons encoded in received polygon data. The method 800 may be implemented by the client device 102, for example.

At block 802, encoded polygon data is received. The client device 102 may receive encoded polygon data from the map data server 104 encoded according to the example method 700. For example, the received polygon data can be encoded as illustrated in FIG. 2. The client device 102 may receive the encoded polygon data via the network 112, for example, in response to the map display application 110 sending a request for polygon data.

At block 804, a stroking of a first polyline or boundary begins based on ordered vertices in an indexed list of vertices. As discussed with reference to FIGS. 2 and 7, a received indexed list of vertices may be ordered to define one or more polylines of a polygon border, and the client device 102 may stroke at least a first of these polylines. Then (block 806), it is determined whether a break index is encountered. If no break index is encountered, a client device may stroke a single polyline indicated by the ordered vertices in the indexed list of vertices and end the stroking of polygon boundaries at block 808. If, however, a break index is reached, a client device may end the stroking of the first polyline and begin stroking a new polyline (block 810), as discussed with reference to FIG. 5. Such a stroking of polylines based on the ordered vertices in an indexed list of vertices and break indices may continue until all boundaries of a polygon are stroked, in an implementation.

In some cases, encoded polygon data may include a list of unstroked edges indices, as further discussed with reference to FIGS. 2 and 4. In such cases, a client device implementing the method 800 may skip the stroking of one or more segments of polylines during stroking of those polylines (blocks 804, 806, 808, and 810) based on indices in the list of unstroked edges indices. In fact, a client device 102 may skip the stroking of an entire polyline based on indices in a list of unstroked edges indices.

At block 812, a polygon is filled based on a description of component shapes of the polygon. For example, the received polygon data may include a description of component shapes, such as a list of triangles indices, or an indication of a simple polygon that may be efficiently tessellated on the client device 102. The client device 102 may fill each of the component shapes indicated in the received or generated description of component shapes to fill the polygon, such as filling triangles of a tessellation as known in the industry. For example, a polygon representing a lake or ocean in a mapping application may be filled with such that it is rendered as a non-transparent blue polygon.

In some implementations, client devices may fill polygons before stroking boundaries. For example, some client devices may execute painters algorithms that implement block 812 before blocks 804, 806, 808, and 810.

Additional Considerations

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter of the present disclosure.

Additionally, certain embodiments are described herein as including logic or a number of components, modules, or mechanisms. Modules may constitute either software modules (e.g., code stored on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term hardware should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware and software modules can provide information to, and receive information from, other hardware and/or software modules. Accordingly, the described hardware modules may be regarded as being communicatively coupled. Where multiple of such hardware or software modules exist contemporaneously, communications may be achieved through signal transmission (e.g., over appropriate circuits and buses) that connect the hardware or software modules. In embodiments in which multiple hardware modules or software are configured or instantiated at different times, communications between such hardware or software modules may be achieved, for example, through the storage and retrieval of information in memory structures to which the multiple hardware or software modules have access. For example, one hardware or software module may perform an operation and store the output of that operation in a memory device to which it is communicatively coupled. A further hardware or software module may then, at a later time, access the memory device to retrieve and process the stored output. Hardware and software modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as an SaaS. For example, as indicated above, at least some of the operations may be performed by a group of computers (as examples of machines including processors), these operations being accessible via a network (e.g., the Internet) and via one or more appropriate interfaces (e.g., APIs).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or a "routine" is a self-consistent sequence of operations or similar processing leading to a desired result. In this context, algorithms, routines and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Upon reading this disclosure, those of skill in the art will appreciate still additional alternative structural and functional designs for representing polygon data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A method for generating representations of polygons, the method comprising:
   generating, by one or more processors, an indexed list of vertices ordered so as to define one or more boundaries of a polygon, wherein each element in the indexed list of vertices specifies respective coordinates in an at least two-dimensional space;
   generating, by the one or more processors, a description of a plurality of component shapes that make up the polygon, wherein the description includes indices into the indexed list of vertices;
   generating, by the one or more processors, a list of break indices, wherein the list of break indices specifies a segmentation of the indexed list of vertices into two or more polylines; and
   providing the indexed list of vertices the description of the plurality of component shapes, and the list of break indices to a computing device for rendering the polygon.

2. The method of claim 1, further comprising:
   generating, by the one or more processors, a list of unstroked edges indices, wherein the list of unstroked edges indices specifies an edge of the polygon that is to remain unstroked during rendering of the polygon; and
   providing the list of unstroked edges indices to the computing device for rendering the polygon.

3. The method of claim 1,
   determining, by the one or more processors, whether the indexed list of vertices represents a simple polygon,
   if the indexed list of vertices represents the simple polygon, replacing the description of the plurality of component shapes that make up the polygon with an indication of a type of the simple polygon; and
   providing the indication of the type of the simple polygon to the computing device for rendering the polygon.

4. The method of claim 1, wherein each element in the indexed list of vertices specifies respective coordinates in the at least two-dimensional space different from coordinates specified in any other element in the indexed list of vertices.

5. The method of claim 1, wherein the description of the plurality of component shapes includes a list of triangles indices indicating a plurality of triangles.

6. The method of claim 5, wherein the list of triangles indices includes a plurality of groups of three indices, each of the plurality of groups of three indices referencing three vertices in the indexed list of vertices defining a respective one of the plurality of triangles.

7. A method for rendering polygons comprising:
   receiving, via a network interface at a client device, an indexed list of vertices of a polygon and a description of a plurality of component shapes that make up the polygon, wherein each element in the indexed list of vertices specifies respective coordinates in an at least two-dimensional space;
   stroking, by a rendering module of the client device, a boundary of the polygon based on an ordering of vertices in the indexed list of vertices;
   determining that the description of the plurality of component shapes is empty;
   filling, by the rendering module, the polygon based on the description of the plurality of component shapes, including leaving the polygon transparent based on the determination that the description of the plurality of component shapes is empty; and
   causing the filled polygon with the stroked boundary to be displayed on a display device of the client device.

8. The method of claim 7, further comprising:
   receiving, via the network interface, a list of break indices,
   wherein stroking the boundary of the polygon based on the ordering of vertices in the indexed list of vertices includes:
   determining a first group of vertices and a second group of vertices in the indexed list of vertices based on a break index in the list of break indices,
   stroking a first polyline of the boundary of the polygon based on an ordering of the first group of vertices, and
   stroking a second polyline of the boundary of the polygon based on an ordering of the second group of vertices.

9. The method of claim 7, further comprising:
   receiving, at the network interface, a list of unstroked edges indices,
   wherein stroking the boundary of the polygon based on the ordering of vertices in the indexed list of vertices includes:
   determining one or more segments of the boundary of the polygon to remain unstroked based on the list of unstroked edges indices, and
   stroking the boundary of the polygon based on the ordering of vertices in the indexed list of vertices while skipping the determined one or more segments.

10. The method of claim 7, wherein the description of the plurality of component shapes only includes an indication of a particular type of simple polygon.

11. The method of claim 10, further comprising:
    determining a formula for generating a locally generated description of component shapes, the locally generated description of component shapes including groups of indices into the indexed list of vertices, and each of the groups of indices defining a particular component shape; and
    generating, by the one or more processors, the locally generated description of component shapes based on the formula,
    wherein filling the polygon based on the description of the plurality of component shapes includes filling the polygon based on the locally generated description of component shapes.

12. The method of claim 7, wherein the description of the plurality of component shapes includes a plurality of groups of three indices, wherein each of the plurality of groups of three indices refers to three vertices in the indexed list of vertices defining a triangle.

13. A client device comprising:
    a display device;
    a communication interface;
    processing hardware coupled to the display device and the communication interface, the processing hardware configured to:
    receive an indexed list of vertices of a polygon and a description of a plurality of component shapes that make up the polygon, wherein each element in the indexed list of vertices specifies respective coordinates on a map tile of a digital map,
    stroke a boundary of the polygon based on an ordering of vertices in the list of vertices and based on a list of unstroked edges indices indicating segments of the boundary of the polygon to remain unstroked, fill the polygon based on the description of the plurality of component shapes, and cause the map tile with the filled polygon and stroked boundary to be displayed on the display device.

14. The client device of claim 13, wherein each element in the list of vertices specifies respective coordinates on the map tile of the digital map different from coordinates specified in any other element in the list of vertices.

15. The client device of claim 13, wherein the processing hardware is further configured to:

receiving a list of break indices, and stroke the boundary of the polygon including:

determining a first group of vertices and a second group of vertices in the list of vertices based on a break index in the list of break indices, stroking a first polyline of the boundary of the polygon based on an ordering of the first group of vertices, and stroking a second polyline of the boundary of the polygon based on an ordering of the second group of vertices.

16. The client device of claim 13, wherein the processing hardware is configured to stroke the boundary of the polygon based on a sequential processing of the list of vertices beginning with the first vertex in the list of vertices.

17. A system comprising:

one or more processors; and a non-transitory computer-readable medium storing thereon instructions that, when executed by the one or more processors, cause the system to:

generate an indexed list of vertices ordered so as to define one or more boundaries of a polygon, wherein each element in the indexed list of vertices specifies respective coordinates in an at least two-dimensional space, generate a list of unstroked edges indices, wherein the list of unstroked edges indices specifies an edge of the polygon that is to remain unstroked during rendering of the polygon, generate a description of a plurality of component shapes that make up the polygon, wherein the description includes indices into the indexed list of vertices, and store the indexed list of vertices the description of the plurality of component shapes, and the list of unstroked edges in a computer-readable memory for retrieval during a rendering of the polygon.

18. The system of claim 17, further comprising:

a display device; and one or more graphics processing units configured to:

retrieve the stored indexed list of vertices and the stored description of the plurality of component shapes, and render an image based on the stored indexed list of vertices and the stored description of the plurality of component shapes for display on the display device.

19. A method for generating representations of polygons, the method comprising:

receiving, by one or more processors, data descriptive of geometry of a polygon;

generating, by the one or more processors, an indexed list of vertices ordered so as to define one or more boundaries of the polygon, wherein each element in the indexed list of vertices specifies respective coordinates in an at least two-dimensional space;

generating, by the one or more processors, a description of a plurality of component shapes that make up the polygon, wherein the description includes indices into the indexed list of vertices; and generating, by the one or more processors, a list of break indices, wherein the list of break indices specifies a segmentation of the indexed list of vertices into two or more polylines;

storing the indexed list of vertices, the description of the plurality of component shapes, and the list of break indices to a computer-readable memory for retrieval during a rendering of the polygon.

* * * * *